(12) United States Patent
Shimasaki et al.

(10) Patent No.: US 11,544,554 B2
(45) Date of Patent: Jan. 3, 2023

(54) ADDITIONAL LEARNING METHOD FOR DETERIORATION DIAGNOSIS SYSTEM

(71) Applicant: Panasonic Intellectual Property Management Co., Ltd., Osaka (JP)

(72) Inventors: Naofumi Shimasaki, Osaka (JP); Kazutaka Ikeda, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 875 days.

(21) Appl. No.: 16/468,830

(22) PCT Filed: Jan. 26, 2018

(86) PCT No.: PCT/JP2018/002390
§ 371 (c)(1),
(2) Date: Jun. 12, 2019

(87) PCT Pub. No.: WO2018/159169
PCT Pub. Date: Sep. 7, 2018

(65) Prior Publication Data
US 2019/0332936 A1    Oct. 31, 2019

(30) Foreign Application Priority Data
Mar. 3, 2017    (JP) .............................. JP2017-040434

(51) Int. Cl.
*G11C 13/00*    (2006.01)
*G06N 3/08*    (2006.01)
(Continued)

(52) U.S. Cl.
CPC ........... *G06N 3/08* (2013.01); *G05B 13/0265* (2013.01); *G06N 3/063* (2013.01)

(58) Field of Classification Search
CPC ...... G11C 13/0004–0069; G11C 11/54; G06N 3/08; G06N 3/063; G06N 3/0454
See application file for complete search history.

(56) References Cited

U.S. PATENT DOCUMENTS

| 5,623,109 A | 4/1997 | Uchida et al. |
| 5,817,958 A | 10/1998 | Uchida et al. |

(Continued)

FOREIGN PATENT DOCUMENTS

| EP | 2752722 A1 | 7/2014 |
| JP | 2-69619 A | 3/1990 |

(Continued)

OTHER PUBLICATIONS

Extended (Supplementary) European Search Report dated Feb. 14, 2020, issued in counterpart application No. 18761745.1. (12 pages).

(Continued)

*Primary Examiner* — Hien N Nguyen
(74) *Attorney, Agent, or Firm* — WHDA, LLP (57) ABSTRACT

A determiner which learns acceleration measurement data which has been obtained by an accelerated aging test and indicates that a facility changes from a normal state to an aged state, and advance label data which is obtained by giving a label to data indicating characteristics of aging in the acceleration measurement data. Measurement data of aging diagnosis is obtained from the facility which is operating, teacher aging degree label data is found from a record of maintenance of the facility, and additional data is obtained from the measurement data and the teacher aging degree label data. When a difference between predicted aging degree label data and teacher aging degree label data is greater than a predetermined value, learning data is selected as additional learning data. The additional learning data is learned to update the determiner.

4 Claims, 7 Drawing Sheets

(51) Int. Cl.
G05B 13/02 (2006.01)
G06N 3/063 (2006.01)

(56) References Cited

U.S. PATENT DOCUMENTS

| | | | |
|---|---|---|---|
| 5,870,728 A | 2/1999 | Yatsuzuka et al. | |
| 2010/0023307 A1* | 1/2010 | Lee | G05B 23/0254 703/7 |
| 2019/0050515 A1* | 2/2019 | Su | G01R 31/007 |
| 2020/0387818 A1* | 12/2020 | Chan | G06F 17/18 |

FOREIGN PATENT DOCUMENTS

| | | |
|---|---|---|
| JP | 6-331507 A | 12/1994 |
| JP | 10-49509 A | 2/1998 |
| JP | 2002-189064 A | 7/2002 |
| JP | 2003-156547 A | 5/2003 |
| JP | 2006-163517 A | 6/2006 |
| JP | 2017-045215 A | 3/2017 |
| WO | 2016/157278 A1 | 10/2016 |

OTHER PUBLICATIONS

International Search Report dated Mar. 27, 2018, issued in counterpart International Application No. PCT/JP2018/002390 (1 page).

* cited by examiner

ADDITIONAL LEARNING METHOD FOR DETERIORATION DIAGNOSIS SYSTEM

TECHNICAL FIELD

The present invention relates to an aging diagnosis system additional learning method of an electric equipment facility.

BACKGROUND ART

Conventionally, there is disclosed an equipment and facility anomaly diagnosis method which includes a signal extractor which detects a specific harmonic component included in an input current of an electric motor which is operating, and a signal processor which converts an output signal from the signal extractor, and can specify an anomaly cause and an anomaly site by comparing a characteristic value including the harmonic component obtained by the signal processor and a predetermined determination reference (for example, see PTL 1).

In a conventional anomaly diagnosis method for constantly monitoring an aged state of a facility which includes a motor including a rotating body and a generator, physical amounts such as a temperature, a sound and vibration mainly indicating a facility state are measured, and a normality and an anomaly are diagnosed in this case based on a predetermined threshold.

CITATION LIST

Patent Literature

PTL 1: Unexamined Japanese Patent Publication No. 2002-189064

PTL 2: Unexamined Japanese Patent Publication No. 2003-156547

SUMMARY OF THE INVENTION

However, the temperature, the sound and the vibration used by the conventional anomaly diagnosis method are highly environmentally dependent. Hence, to weaken this environment dependence, it is necessary to set initial values of an enormous amount of complex threshold parameters per diagnosis target facility. Simultaneously, it is necessary to continuously make fine adjustment of these parameters. Therefore, there is a problem that regular maintenance by a professional is necessary, and a great amount of man hours is required for aging diagnosis of the facility.

The present invention solves the conventional problem, and an object of the present invention is to increase a learning effect while appropriately selecting a necessary learning data amount for regular additional learning when causing a determiner created by an accelerated aging test to perform additional learning.

To achieve the object, the present invention updates the determiner created by using initial learning data of the accelerated aging test based on measurement data during an operation of the facility, and teacher aging degree label data of the facility.

More specifically, an aging diagnosis system additional learning method according to one aspect of the present invention includes: an initial learning step of creating a determiner that has been caused to learn continuous acceleration measurement data and advance label data, the acceleration measurement data being obtained by an accelerated aging test and indicating that a facility changes from a normal state to an aged state, and the advance label data being obtained by giving a label to data indicating characteristics of aging in the acceleration measurement data; a step of obtaining measurement data of aging diagnosis from the facility in operation; a step of finding teacher aging degree label data from a record of maintenance of the facility; a step of obtaining additional data from the measurement data and the teacher aging degree label data; a step of selecting learning data as additional learning data when a difference between predicted aging degree label data obtained by causing the determiner to determine all items of the learning data including the additional data, and the teacher aging degree label data included in the all items of the learning data is greater than a predetermined value; and a step of learning the additional learning data and updating the determiner.

According to this aspect, the determiner is caused to learn the acceleration measurement data obtained by the accelerated aging test and the advance label data for the acceleration measurement data and is thereby created, and additional learning data obtained from the measurement data of aging diagnosis and the teacher aging degree label data obtained from a record of maintenance is used to update the determiner. Consequently, it is possible to make the additional data which is non-continuous learning data obtained at a site suit to initial learning data which is continuous reference data. As a result, it is possible to enhance accuracy of an aging determination reference of the monitoring target facility. Consequently, it is possible to increase a learning effect while appropriately selecting a necessary learning data amount for additional learning.

Furthermore, the step of obtaining the additional data, the step of selecting the learning data as the additional learning data, and the step of updating the determiner may be repeatedly performed every time maintenance is performed.

Consequently, it is possible to update the learning degree of the determiner every time the maintenance is performed.

Furthermore, the step of selecting the learning data as the additional learning data may include a step of, when the determiner makes determination on the all items of the learning data including the additional data, and determined data is data whose unknown degree with respect to the learning data is higher than a predetermined threshold, determining the determined data as unknown data, and a step of selecting the unknown data as the additional learning data of the learning data.

According to this aspect, even when the unknown degree is data higher than the predetermined threshold, it is possible to add the unknown degree as learning data to the determiner and, consequently, support unknown data which is likely to differ per site.

Furthermore, the facility that is the aging diagnosis target may include an electric motor including a rotating body.

Consequently, a harmonic sensor obtains a current fluctuation component of the electric motor, so that it is possible to detect aging of the facility.

According to the present invention, when the determiner created by the accelerated aging test is caused to perform additional learning, it is possible to increase a learning effect by site labeling while appropriately selecting a necessary learning data amount for regular additional learning.

DESCRIPTION OF EMBODIMENT

Exemplary Embodiment

The exemplary embodiment of the present invention will be described.

The aging diagnosis system additional learning method according to the exemplary embodiment of the present invention uses measurement data continuously obtained by an accelerated aging test of a facility as initial learning data which is an initial reference, and causes a determiner which is created based on the initial learning data to additionally learn characteristic site data non-continuously obtained from the aging diagnosis target facility, and thereby can obtain a continuous determination reference while using non-continuous data from the facility at the site.

STEP 1, STEP 2 and STEP 3 will be successively described below as a specific example with reference to FIG. 1. STEP 1 is an accelerated experiment step of using a simulated test device of a facility including a rotating body which is driven by an electric motor. STEP 2 is a step of giving labels to continuous acceleration measurement data which is obtained from the accelerated test and data which is obtained by the acceleration measurement data and has aging characteristics of the facility, learning the data and creating a determiner which is an initial reference. STEP 3 is a step of constantly determining a facility aging degree by using the determiner from the aging diagnosis target facility, giving a label to measurement data by using non-continuous data such as a maintenance record of the facility, and causing the determiner to additionally learn the additional learning data selected from all items of learning data further including past data.

Figure 1:
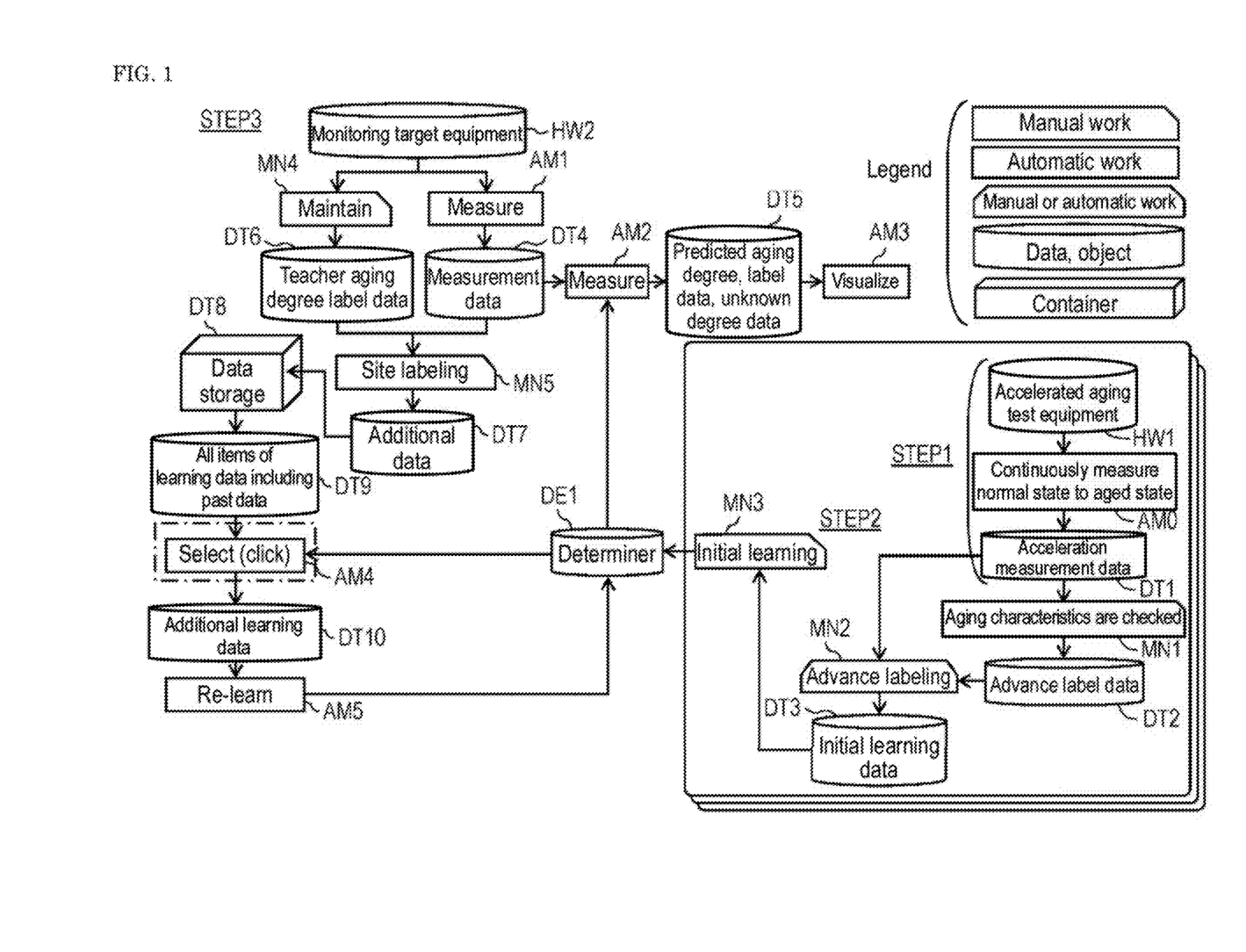
FIG. 1 is a configuration diagram illustrating an aging diagnosis system which realizes an aging diagnosis system additional learning method according to an exemplary embodiment of the present invention.

FIG. 1 is a configuration diagram illustrating an aging diagnosis system which realizes the aging diagnosis system additional learning method according to the exemplary embodiment of the present invention.

(STEP 1)

Accelerated aging test equipment (accelerated text device) HW1 includes, for example, a bearing (bearing) which is coupled to an other end of a rotary shaft of an electric motor. Accelerated aging test equipment HW1 applies, for example, a load of 1.8 t by a load generator near the bearing. A side of the rotary shaft opposite to the electric motor with respect to a load application portion is coupled with a generator. A harmonic sensor for aging determination is provided at a connecting part of the generator and a load of the generator.

The accelerated aging test device to which the load has been applied in this way is operated for one week, for example, to obtain continuous acceleration measurement data DT1 indicating that a state changes from a normal state, to an abrasion state and then to a malfunction state (AM0). More specifically, acceleration measurement data DT1 is raw data of a harmonic measured at intervals of approximately 20 seconds. In addition, a part of a facility which is an aging diagnosis target is not limited to a bearing, and can be a gear, a ball screw and a belt, too.

Furthermore, when the bearing ages due to the above load as is publicly known, the bearing causes characteristic vibration. The characteristic vibration which has occurred propagates to a rotor of the electric motor, and changes an angular velocity. A current harmonic is produced in response to the change of this angular velocity, so that, by measuring the produced current harmonic by a harmonic sensor, it is possible to diagnose an aged state of a machine.

(STEP 2)

A graph which connects, for example, maximum values, minimum values, variance values or average values of the harmonic is created for each obtained acceleration measurement data DT1 to check a characteristic portion of the change, i.e., an aging characteristic portion (MN1). When the characteristic portion is checked MN1 by a manual work, a label corresponding to an aging degree is given to create label data DT2.

Next, acceleration measurement data DT1 and advance label data DT2 equivalent to the aging characteristics of acceleration measurement data DT1 are associated by a manual work or an automatic work. This is referred to as labeling. In this regard, this labeling will be distinguished from labeling during an operation of the monitoring target equipment and referred to as advance labeling MN2. Advance labeling MN2 is used to create initial learning data DT3.

Next, determiner DE1 is caused to learn created initial learning data DT3 (initial learning MN3). As described above, initial reference learning is executed, so that determiner DE1 is created.

(STEP 3)

Next, the harmonic sensor is attached to monitoring target equipment HW1 which is the aging diagnosis target, and harmonic data is measured on a regular basis or at a time of occurrence of an optional event (AM1). Measured measurement data DT4 is applied to determiner DE1 to obtain predicted aging degree label data and unknown degree data DT5. Subsequently, these predicted aging degree label data and unknown degree data DT5 are output to a display or a printer and visualized (AM3).

According to the present exemplary embodiment, teacher aging degree label data DT6 obtained by constant monitoring by the harmonic sensor and, in addition, maintenance work MN4 performed by the manual work on a regular basis or on an irregular basis is obtained. The teacher aging degree label data refers to data to which a label for distinguishing information necessary for determination or evaluation from other information has been given.

Next, site labeling MN5 for distinguishing necessary data for determining aging of monitoring target equipment HW2 by the manual work based on obtained teacher aging degree label data DT6 and above measurement data DT4 is performed. In this case, obtained teacher aging degree label data DT6 and measurement data DT4 can be matched based on mutual time stamps. Additional data DT7 is created by site labeling MN5, and is temporarily stored in data storage DT8. In addition, data storage. DT8 includes all of past data such as initial learning data DT3, too.

Next, determiner DE1 is used to make determination on all items of learning data DT9 including past data and extracted from data storage DT8 to select new additional learning data DT10 (selection processing AM4). In addition, selection processing AM4 will be described in detail later with reference to FIG. 2.

Next, selected additional learning data DT10 is used for re-learning AM5 of determiner DE1 to grow determiner DE1. In this regard, re-learning AM5 is performed after selection processing AM4 of data of all items of learning data DT9 is finished once. By so doing, it is possible to prevent a rise in an erroneous determination rate of past data due to an update of determiner DE1 in the middle.

Figure 2:
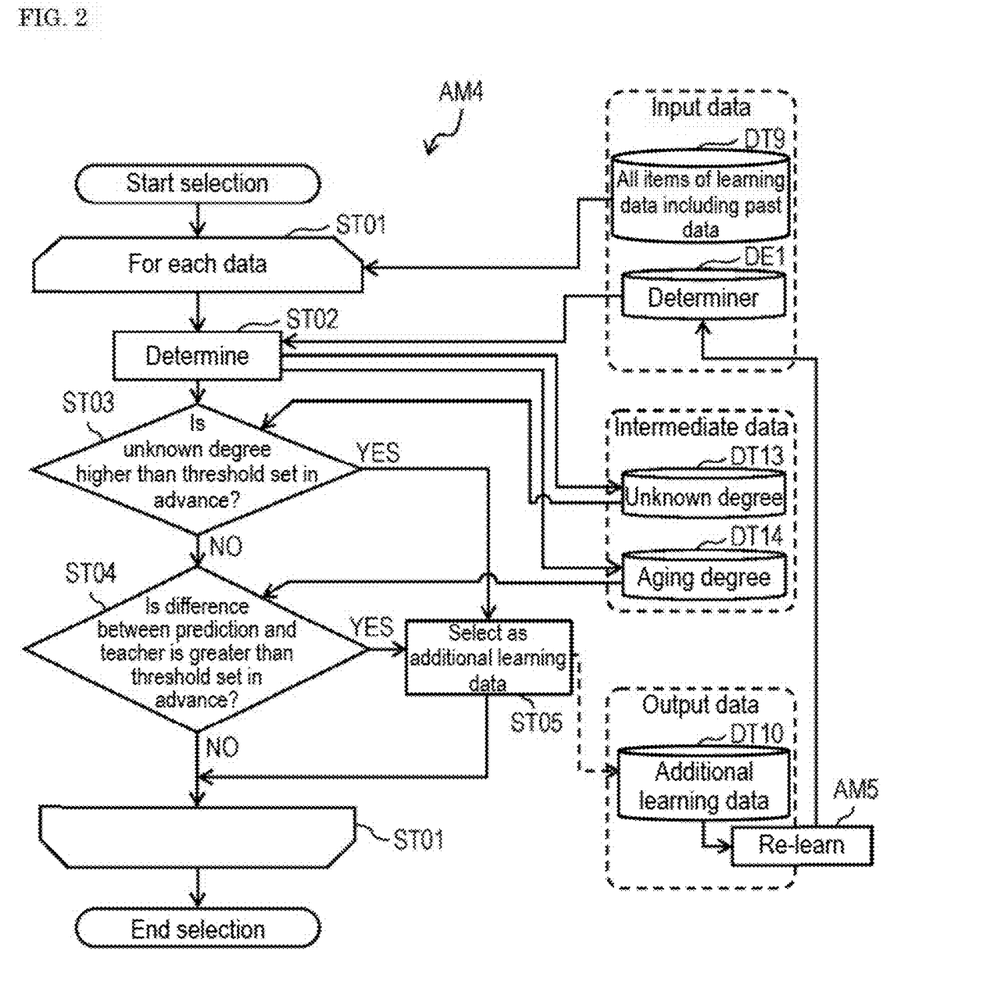
FIG. 2 is a flowchart illustrating a selecting process of the aging diagnosis system in FIG. 1.

Next, selection processing AM4 will be described with reference to FIG. 2. FIG. 2 is a flowchart illustrating a selection process of the aging diagnosis system in FIG. 1. In addition, the same components as the components illustrated in FIG. 1 will be assigned the same reference numerals in FIG. 2 and subsequent drawings, and description of the components will be omitted.

As illustrated in FIG. 2, the following processing is performed on all items of learning data DT9 including the past data in step ST01.

That is, in next step ST02, determiner DE1 determines the aging degree of monitoring target equipment HW2 one data by one data. According to this determination processing, data (referred to as "data including an unknown degree" in this case) DT13 including an unknown pattern in a waveform compared to existing learning data is stored as intermediate data. Simultaneously, predicted aging degree label data DT14 is stored as intermediate data.

When data DT13 including the unknown degree of the intermediate data is a higher value than a threshold to which the unknown degree is set in advance in next step ST03, additional learning data is selected as unknown data in next step ST05. On the other hand, when data DT03 does not correspond to the unknown data, i.e., known data in step ST03, the step moves to next step ST04.

When an expected output value cannot be obtained as a result of aging determination in next step ST04, the data is selected as additional learning data in next step ST05. More specifically, when the difference between predicted aging degree label data DT14 of intermediate data and teacher aging degree label data DT6 included in the learning data is a value higher than a threshold provided in advance in step ST04, the data which is being determined is selected as additional learning data DT10 in next step ST05.

The above selection processing is repeatedly performed on all items of learning data including past data.

Thus, according to the present exemplary embodiment, in STEP 3, teacher aging degree label data DT6 which is non-continuous aging data obtained at the site can be suited to predicted aging degree label data DT14 which is continuous reference data. Consequently, it is possible to increase an aging determination reference probability of monitoring target equipment HW2.

Figure 3:
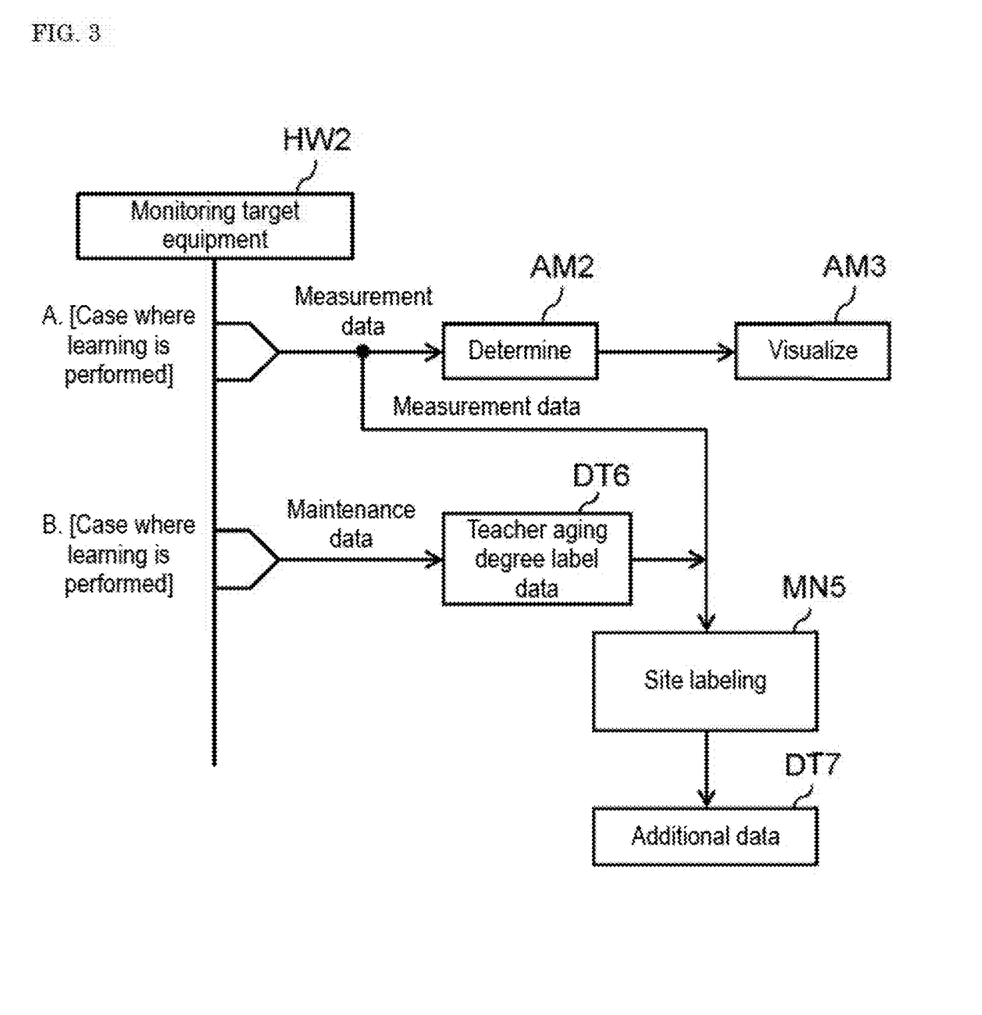
FIG. 3 is a schematic flowchart illustrating a learning timing of a determiner of the aging diagnosis system according to the exemplary embodiment of the present invention.

FIG. 3 is a schematic processing flowchart illustrating a learning timing of a determiner of the aging diagnosis system according to the exemplary embodiment of the present invention. As illustrated in FIG. 3, first, in case A: [a case where learning is not performed], determiner DE1 makes determination AM2 on, for example, measurement data constantly monitored by using the harmonic sensor and only visualizes AM3 the data. Hence, determiner DE1 does not perform learning. As illustrated in FIG. 1, the measurement data in this case is accumulated in DT4, and is further stored in data storage DT8.

By contrast with this, in case B: [a case where learning is performed], when determiner DE1 is caused to perform learning, a maintenance work is performed by a manual work. In this case, as described above, teacher aging degree label data DT6 is obtained from maintenance data. Subsequently, obtained teacher aging degree label data DT6 and measurement data are cross-checked to perform site labeling MN5 and create additional data DT7. Additional learning data DT10 which needs to be additionally learned is selected by selection processing AM4, and determiner DE1 is caused to perform re-learning.

Thus, a first condition that determiner DE1 is caused to perform re-learning is that maintenance is performed.

In addition, in the following case, even if the maintenance is performed, determiner DE1 is not caused to perform learning. That is, as is clear from the flowchart in FIG. 2, in a case where the unknown degree of the determination target data is low, and a case where there is no significant difference between a determination result and an output value to be expected, and, more specifically, in a case where there is little difference between predicted aging degree label data DT14 and teacher aging degree label data DT6, determiner DE1 is not caused to perform re-learning.

Furthermore, in a case where teacher aging degree label data DT6 cannot be obtained even when maintenance is performed and a case where there is not a sufficient period between current maintenance and previous maintenance, re-learning is not performed. In this case, the sufficient period between the current maintenance and the previous maintenance can be optionally determined by a facility of monitoring target equipment HW2 or an operation ratio.

Hereinafter, an outline of machine learning according to the present exemplary embodiment will be described. The neural network used in the present exemplary embodiment is a feed forward neural network in which data sequentially propagates from an input layer to an intermediate layer and an output layer. As is well known, learning of the neural network refers to constructing a system which can cause the neural network to learn a parameter (coupling load) which minimizes an error between the input layer and the output layer by using an error back propagation method for an arithmetic operation model obtained by combining a product-sum operation and a non-linear function (active function) at multiple stages, and estimate an appropriate output to an optional input.

Figure 4:
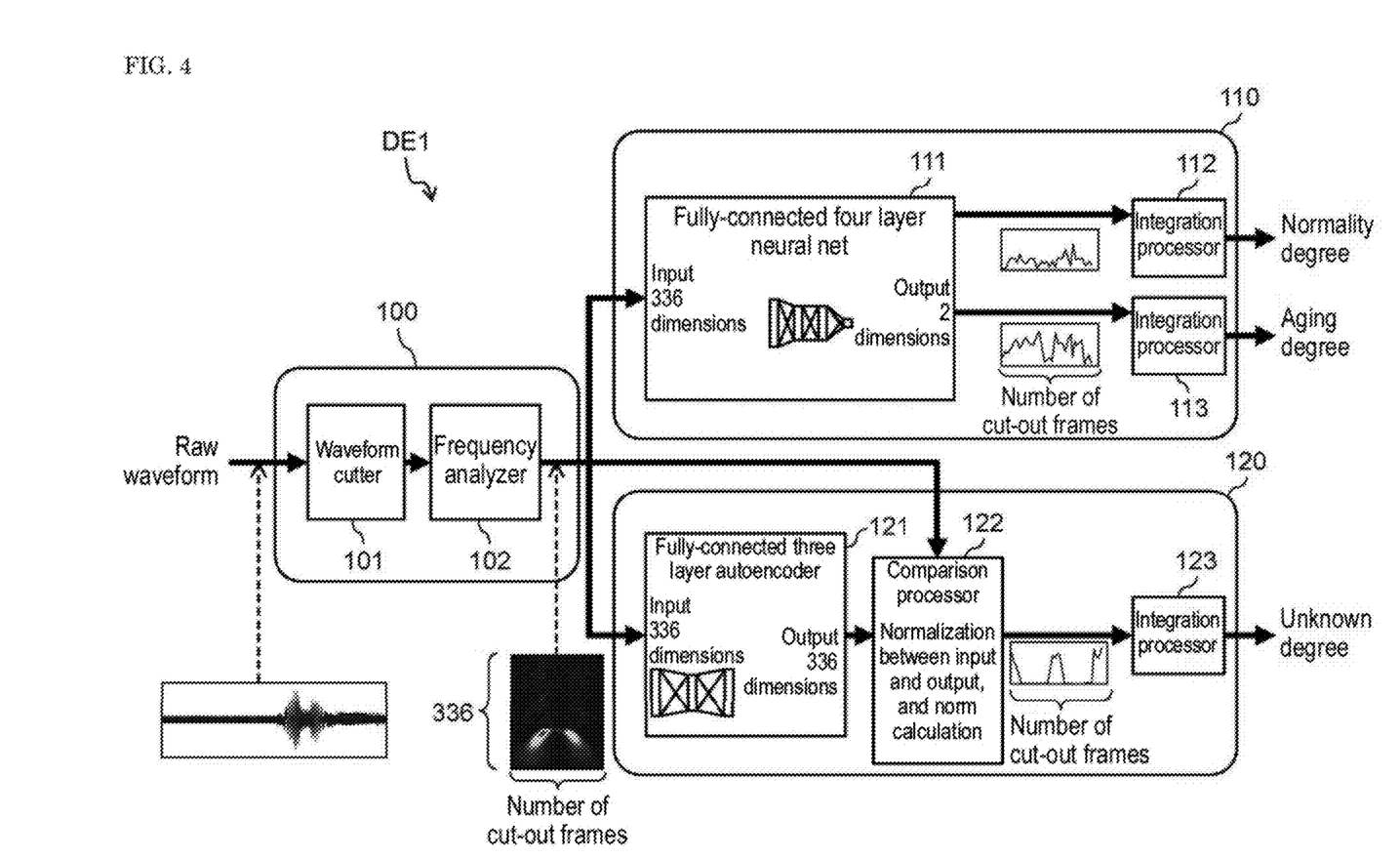
FIG. 4 is a configuration diagram illustrating the determiner which makes up the aging diagnosis system according to the exemplary embodiment of the present invention.

FIG. 4 is a configuration diagram illustrating determiner DE1 which makes up the aging diagnosis system according to the exemplary embodiment of the present invention. As illustrated in FIG. 4, determiner DE1 includes characteristic filter 100, normality/aging degree determiner 110 and unknown degree determiner 120.

Characteristic filter 100 includes waveform cutter 101 which receives an input of measurement data, and frequency analyzer 102 which analyzes a frequency of the cut-out measurement data.

Normality/aging degree determiner 110 includes fully-connected four layer neural network 111 which receives an output from characteristic filter 100 and outputs two-dimensional data, and first integration processor 112 and second integration processor 113 which receive an output from fully-connected four layer neural network 111. First integration processor 112 outputs a normality degree to an outside. Second integration processor 113 outputs an aging degree to the outside.

Unknown degree determiner 120 includes fully-connected three layer autoencoder 121, comparison processor 122 and integration processor 123. Fully-connected three layer autoencoder 121 receives and encodes the output from characteristic filter 100. Comparison processor 122 compares the output from fully-connected three layer autoencoder 121 and the output from characteristic filter 100. Integration processor 123 receives an output from comparison processor 122, and outputs the unknown degree to the outside.

The waveform cutter 101 and frequency analyzer 102 designate, for example, 336 dimensions as a characteristic amount, and cuts a predetermined number as a number of frames.

Fully-connected four layer neural network 111 converts 336-dimensional input data from characteristic filter 100 into two-dimensional data, and outputs a first output and a second output. First integration processor 112 which receives the first output integrates data corresponding to the number of cut-out frames, and outputs, for example, the normality degree. Second integration processor 113 which receives the second output integrates data corresponding to the number of cut-out frames, and outputs, for example, the aging degree.

Fully-connected three layer autoencoder 121 performs predetermined encoding on 336-dimensional input data from characteristic filter 100, and outputs 336-dimensional output data. Comparison processor 122 compares the data encoded by fully-connected three layer autoencoder 121 and data subjected to frequency analysis by characteristic filter 100. That is, comparison processor 122 performs comparison processing by performing normalization and norm computation between the input data and the output data in fully-connected three layer autoencoder 121. Integration processor 123 integrates data corresponding to the number of cut-out frames, and outputs the unknown degree.

In addition, in the present exemplary embodiment, as described with reference to the flowchart in FIG. 2, when the unknown degree of the output data of unknown degree determiner 120 in FIG. 4 is high in step ST03, the output data can be selected as additional learning data.

When the normality degree and the aging degree of the output data of normality/aging degree determiner 110 in FIG. 4 is different from an expected output value in step ST04 in FIG. 2, too, the output data can be selected as the additional learning data.

Thus, even in a case of measurement data whose expected normality degree or expected aging degree is difficult to estimate or measurement data of a high unknown degree while monitoring target equipment HW2 is constantly monitored, it is possible to grow a learning degree of the aging diagnosis system according to the present exemplary embodiment, i.e., determiner DE1.

As described above, the aging diagnosis system additional learning method according to the present exemplary embodiment includes: an initial learning step of creating determiner DE1 which has been caused to learn continuous acceleration measurement data DT1 which has been obtained by an accelerated aging test and indicating that a facility changes from the normal state to the aged state, and advance label data DT2 which has been obtained by giving a label to data indicating characteristics of aging of acceleration measurement data DT1; a step of obtaining measurement data DT4 of aging diagnosis from the facility which is operating; a step of calculating teacher aging degree label data DT6 from a record of maintenance of the facility; a step of obtaining additional data DT7 from measurement data DT4 and teacher aging degree label data DT6; a step of, when a difference between predicted aging degree label data DT14 obtained when determiner DE1 makes determination on all items of learning data DT9 including additional data DT7, and teacher aging degree label data DT6 included in all items of learning data DT9 is greater than a predetermined value, selecting learning data as additional learning data DT10; and a step of learning additional learning data DT10 and updating determining determiner DE1.

Consequently, additional learning data DT10 obtained from measurement data DT4 of the aging diagnosis and teacher aging degree label data DT6 obtained from the record of maintenance from the facility which is operating is used to update determiner DE1. Consequently, it is possible to suit additional data DT7 which is non-continuous learning data obtained at the site to initial learning data which is continuous reference data. As a result, it is possible to enhance aging determination reference accuracy of the monitoring target facility. Consequently, it is possible to increase the learning effect while appropriately selecting a necessary learning data amount for additional learning.

Furthermore, the step of obtaining additional data DT7, the step of selecting the learning data as additional learning data DT10 and the step of updating determiner DE1 may be repeatedly performed every time maintenance is performed.

Consequently, it is possible to update the learning degree of the determiner every time maintenance is performed.

Furthermore, the step of selecting the learning data as additional learning data DT10 may include a step of, when determiner DE1 makes determination on all items of learning data DT9 including additional data DT7 and when the determined data is data whose unknown degree with respect to the learning data is higher than a predetermined threshold, determining the determined data as unknown data, and a step of selecting the unknown data as additional learning data DT10 of the learning data.

Consequently, even data whose unknown degree is higher than the predetermined threshold can be added as the learning data to the determiner, so that it is possible to support unknown data, too, which is likely to differ per site.

Furthermore, the facility which is the aging diagnosis target may include the electric motor including a rotating body.

Consequently, the harmonic sensor obtains a current fluctuation component of the electric motor, so that it is possible to detect aging of the facility.

Example

Figure 5:
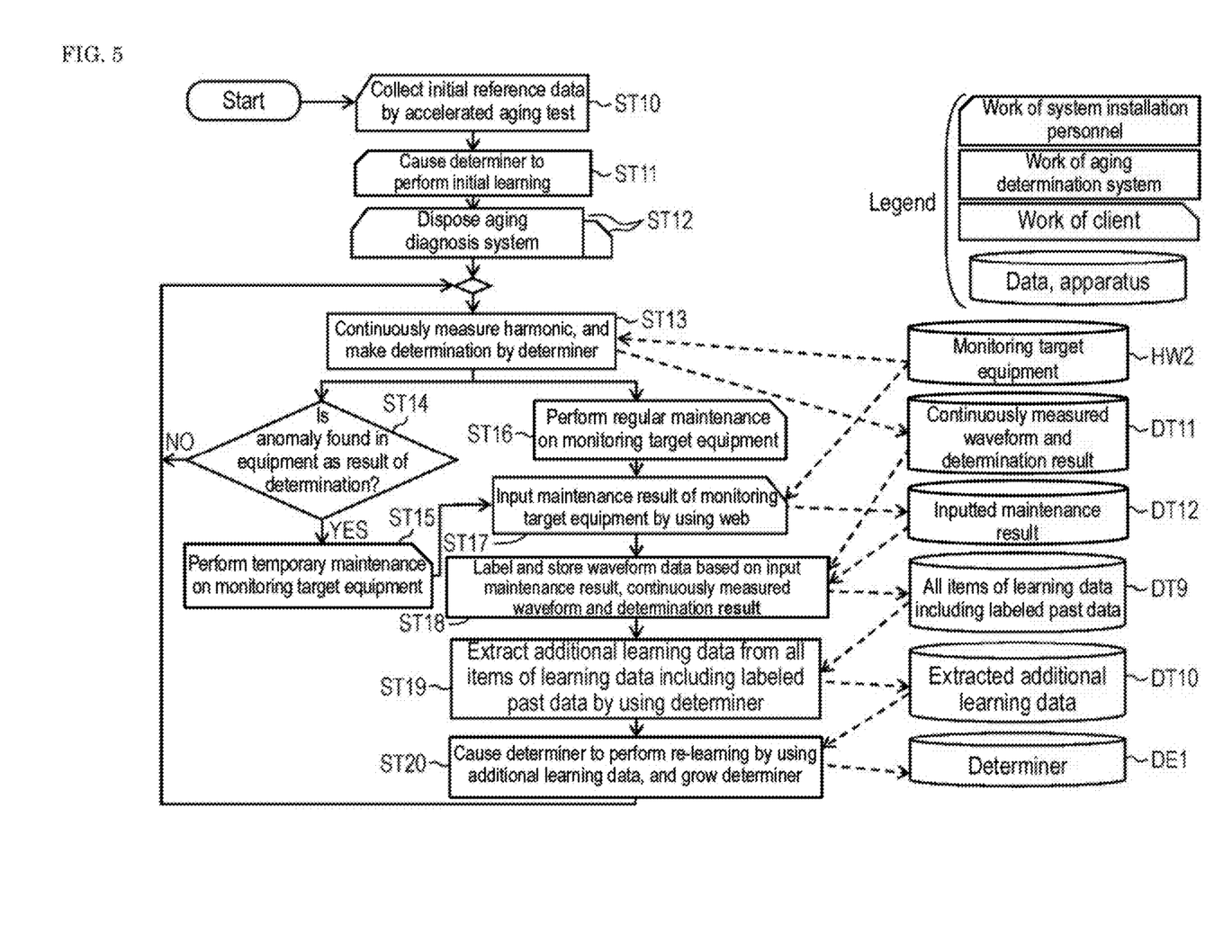
FIG. 5 is a flowchart illustrating an aging diagnosis system additional learning method according to an example of the present invention.

FIG. 5 is a flowchart illustrating a use method of the aging diagnosis system according to the example of the present invention. First, in step ST10, initial reference data is collected by an accelerated aging test. Next, in step ST11, determiner DE1 is caused to perform initial learning. The above corresponds to above STEP 1 and STEP 2.

Next, in step ST12, this aging diagnosis system is disposed in monitoring target equipment HW2 of a client.

Next, in step ST13, this aging diagnosis system is operated. That is, the harmonic sensor continuously measures for monitoring target equipment HW2 which is operating the harmonic emitted by monitoring target equipment HW2, and determiner DE1 makes determination on the measured data.

Waveform data continuously measured in this case and a determination result are stored as a waveform and determination result data DT11.

When it is determined in step ST14 that there is no anomaly in monitoring target equipment HW2, the flow returns to step ST13. On the other hand, when it is determined in step ST14 that there is an anomaly in monitoring target equipment HW2, temporary maintenance is performed on monitoring equipment HW2 in step ST15. Subsequently, in step ST17, the Internet (a WEB or cloud computing) is used to store a maintenance result of monitoring target equipment HW2 as maintenance result data DT12.

In step ST16 performed in parallel to step ST14, the client performs regular maintenance on monitoring target equipment HW2. In step ST17, the maintenance result of monitoring target equipment HW2 in step ST16 is input as maintenance result data DT12 on the Internet by using the WEB.

Next, in step ST18, waveform data is labeled (site labeling) from the continuously measured waveform, determination result data DT11 and input maintenance result data DT12, and is stored as all items of learning data DT9 including the past data.

Next, in step ST19, determiner DE1 is used to extract the learning data from all items of learning data DT9 including the labeled past data and is stored as extracted additional learning data in DT10. This process corresponds to selection processing AM4 illustrated in FIGS. 1 and 2.

Next, in step ST20, extracted additional learning data DT10 is used to cause determiner DE1 to perform re-learning and grow determiner DE1.

Figure 6:
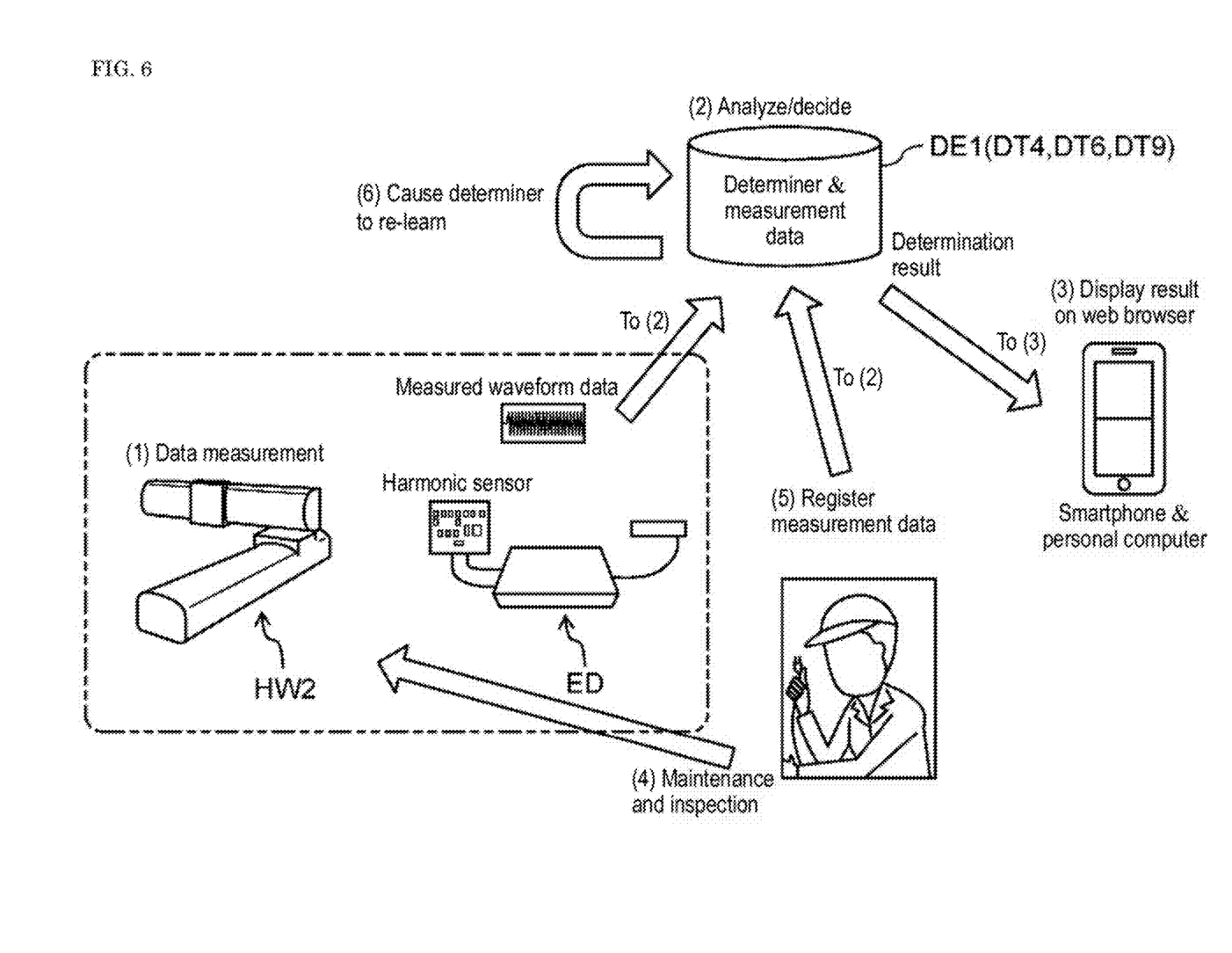
FIG. 6 is a schematic view illustrating a use mode of a client who uses the aging diagnosis system according to the example of the present invention.

In this regard, a client's use mode of the aging diagnosis system according to this example will be described with reference to FIG. 6. FIG. 6 is a configuration diagram illustrating the use mode of the client who uses the aging diagnosis system according to the example of the present invention.

(1) The harmonic sensor is disposed at a predetermined site of monitoring target equipment HW2. The harmonic sensor is connected with edge device ED which is a terminal which can connect with the Internet, and edge device ED is further connected with the Internet.

(2) When monitoring target equipment HW2 is operating, for example, measurement data DT4 is registered on the WEB via the harmonic sensor and edge device ED, and determiner DE1 performs the above analysis and determination.

(3) This determination result can be occasionally browsed on a WEB browser from a smartphone and a personal computer.

(4) In parallel to above (2), during a period of regular maintenance or when the determination result of determiner DE1 indicates a failure, maintenance and inspection are performed by a manual work.

(5) Measurement data obtained during the maintenance and the inspection is registered as above teacher aging degree label data DT6 on the WEB.

(6) Data for re-learning is selected from all items of learning data DT9 including additional data obtained by site labeling and including past data, and determiner DE1 is caused to re-learn the selected data.

Figure 7:
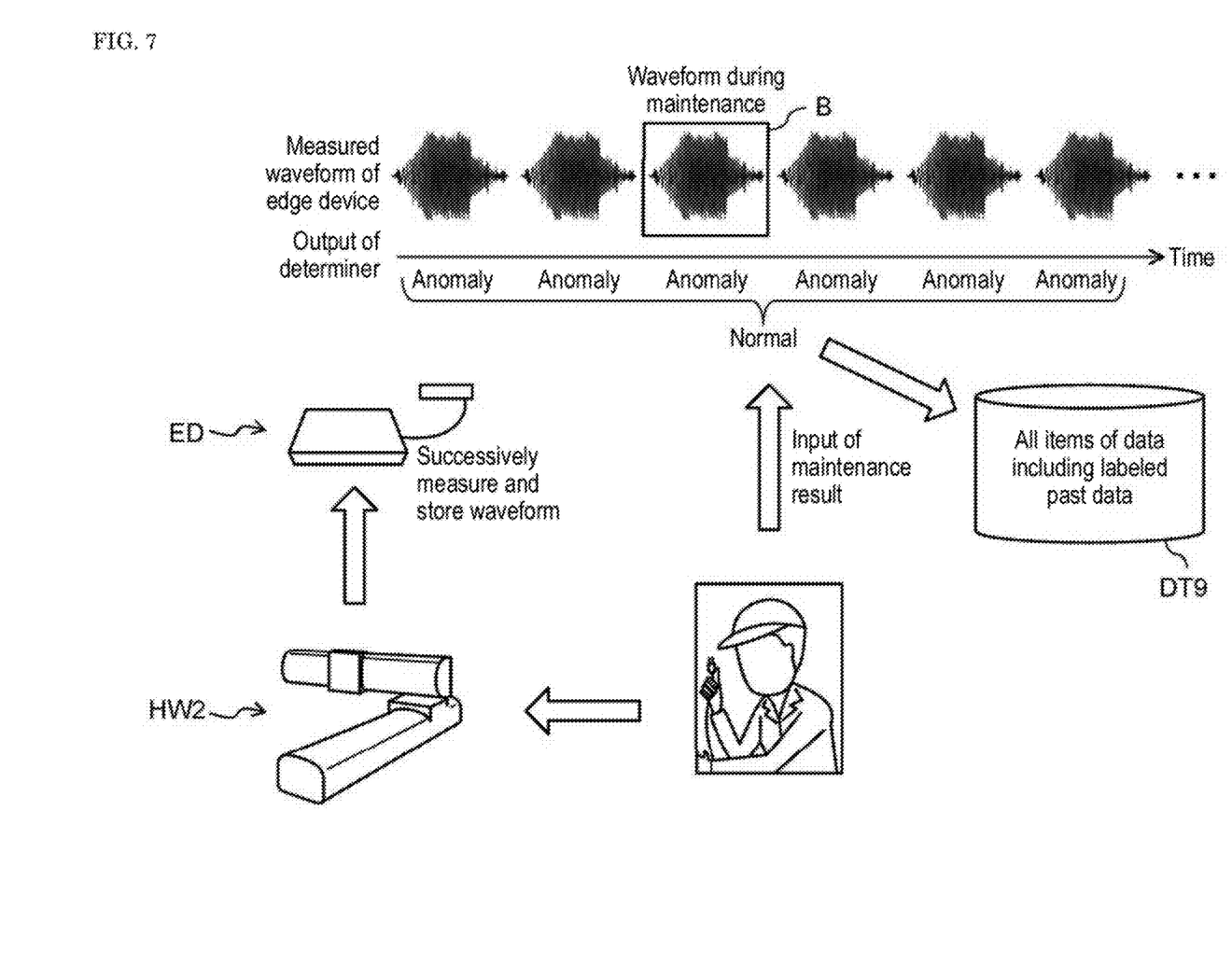
FIG. 7 is a schematic view illustrating an outline of processing of extracting a waveform from measurement data during maintenance and labeling processing in a case where the aging diagnosis system according to the example of the present invention is used.

Hereinafter, even in a case where, when data which has been determined as an anomaly is continuously output as measurement data which is constantly monitored online or measurement data during regular maintenance, monitoring target equipment HW2 is normally operated by maintenance of a manual work will be described. Processing of extracting a waveform from the maintenance data and labeling processing in this case will be described with reference to FIG. 7. FIG. 7 is a schematic view illustrating an outline of processing of extracting a waveform from measurement data during maintenance, and labeling processing in a case where the aging diagnosis system according to the example of the present invention is used.

When, for example, determiner DE1 continuously outputs the anomaly a plurality of times (twice in FIG. 7) in response to the waveform measured by the harmonic sensor and edge device ED as illustrated in FIG. 7, maintenance by a manual work is performed. FIG. 7 illustrates a measured waveform of the edge device in an upper row. The output of determiner DE1 in response to each measured waveform is illustrated below the measured waveform of the edge device. When data of waveform B illustrated in FIG. 7 is observed during maintenance, and at least one condition of following five conditions is satisfied, a label of a measurement result is changed from "anomaly" to "normal" together with preceding and subsequent data including the data of waveform B obtained during the maintenance. Simultaneously, all items of learning data DT9 including the labeled past data are updated.

In this regard, the five conditions that labels of a plurality of measurement results are collectively changed as follows.
 i) Times stamps are close.
 ii) Waveform shapes are similar.
 iii) An Euclidean distance between waveforms is smaller than a threshold set in advance.
 iv) An Euclidean distance between characteristic parameters after certain characteristics are extracted is smaller than a threshold set in advance.
 v) An Euclidean distance between output values (aging degrees or unknown degrees) from determiner DE1 is smaller than a threshold set in advance.

Thus, even when an anomaly indicating a high aging degree is continuously detected in measurement data which is constantly monitored online or measurement data during regular maintenance, the additional learning method of the aging diagnosis system according to the exemplary embodiment and the example can recover the abnormal state to the normal state by emergency maintenance. Furthermore, it is possible to perform constant monitoring again online.

INDUSTRIAL APPLICABILITY

The aging diagnosis system additional learning method according to the present invention is useful for an aging diagnosis system of an electric device facility.

REFERENCE MARKS IN THE DRAWINGS

DE1: determiner
ED: edge device
HW1: accelerated aging test equipment
HW2: monitoring target equipment
100: characteristic filter
101: waveform cutter
102: frequency analyzer
110: normality/aging degree determiner
111: fully-connected four layer neural network
112: first integration processor
113: second integration processor
120: unknown degree determiner
121: fully-connected three layer autoencoder
122: comparison processor
123: integration processor

The invention claimed is:

1. Degradation diagnosis system additional learning method of an electric equipment facility, the method comprising:
   an initial learning step by a determiner, the step including learning continuous acceleration measurement data using a simulated test device of the facility and advance label data, the acceleration measurement data being obtained by an accelerated aging test and indicating that a facility changes from a normal state to an aged state, and the advance label data being obtained by giving a label to data indicating characteristics of aging in the acceleration measurement data;
   an additional learning step of obtaining measurement data of aging diagnosis from the facility in operation;
   a step of finding teacher aging degree label data obtained from a record of maintenance of the facility, the maintenance being operated manually;
   a step of obtaining additional data from the measurement data and the teacher aging degree label data and temporarily storing the additional data in a data storage;
   a step of obtaining predicted aging degree label data by causing the determiner to determine the predicted aging degree label data from the advance label data, the measurement data of the aging diagnosis, the teacher aging degree label data, and the additional data,
   a step of selecting the predicted aging degree label data as additional learning data when a difference between predicted aging degree label data and the teacher aging degree label data is greater than a predetermined value; and
   a step of learning the additional learning data and updating the determiner by using the additional learning data.

2. The degradation diagnosis system additional learning method according to claim 1, wherein the step of obtaining the additional learning data, the step of selecting the learning data as the additional learning data, and the step of updating the determiner are repeatedly performed every time the maintenance is performed.

3. The degradation diagnosis system additional learning method according to claim 1, wherein the step of selecting the learning data as the additional learning data includes:
   a step of, when the determiner makes determination on the advance label data, the measurement data of the aging diagnosis, the teacher aging degree label data, and the additional data and determined data is data whose unknown degree with respect to the learning data is higher than a predetermined threshold, determining the determined data as unknown data; and
   a step of selecting the unknown data as the additional learning data of the learning data.

4. The degradation diagnosis system additional learning method according to claim 1, wherein the facility includes an electric motor including a rotating body.

* * * * *